United States Patent
McCarthy et al.

(10) Patent No.: US 6,541,550 B1
(45) Date of Patent: *Apr. 1, 2003

(54) LOW TEMPERATURE THERMALLY ACTIVATED WATER-DISPERSED ADHESIVE COMPOSITIONS

(75) Inventors: Arianne E. McCarthy, London (CA); Terry J. Rayner, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,071

(22) Filed: Apr. 5, 2000

(51) Int. Cl.[7] .............................. C08J 5/10; C08K 5/29; C08L 75/00
(52) U.S. Cl. ................ 524/195; 428/304.4; 428/314.1; 428/319.7; 428/319.9; 428/344; 428/346; 428/349; 428/412; 428/423.1; 428/423.3; 428/423.5; 428/423.7; 428/424.2; 428/425.8; 524/247; 524/249
(58) Field of Search ................................. 524/195, 247, 524/249; 428/304.4, 314.4, 319.7, 319.9, 344, 346, 349, 412, 423.1, 423.3, 423.5, 423.7, 424.2, 425.8

(56) References Cited

U.S. PATENT DOCUMENTS

| | | |
|---|---|---|
| 4,130,528 A | 12/1978 | Chen |
| 4,250,070 A | 2/1981 | Ley et al. |
| 4,342,843 A | 8/1982 | Perlinski et al. |
| 4,463,110 A | 7/1984 | Perlinski et al. |
| 4,485,200 A | 11/1984 | Perlinski et al. |
| 4,820,863 A | 4/1989 | Taylor |
| 4,855,001 A | 8/1989 | Damico et al. |
| 4,931,494 A | 6/1990 | Auchter et al. |
| 5,008,363 A | 4/1991 | Mallon et al. |
| 5,047,588 A | 9/1991 | Taylor |
| 5,051,474 A | 9/1991 | Warren et al. |
| 5,081,173 A | 1/1992 | Taylor |
| 5,108,653 A | 4/1992 | Taylor |
| 5,176,777 A | 1/1993 | Guilhem |
| 5,258,481 A * | 11/1993 | Hesselmans et al. .......... 528/28 |
| 5,543,455 A | 8/1996 | Shah |
| 5,574,083 A | 11/1996 | Brown et al. |
| 5,608,000 A | 3/1997 | Duan et al. |
| 5,610,232 A | 3/1997 | Duan et al. |
| 5,624,758 A | 4/1997 | Maksymkiw et al. |
| 5,652,288 A | 7/1997 | Wood et al. |
| 5,652,299 A | 7/1997 | Nakajima et al. |
| 5,703,158 A | 12/1997 | Duan et al. |
| 5,717,025 A | 2/1998 | Maksymkiw et al. |
| 5,721,302 A | 2/1998 | Wood et al. |
| 5,739,201 A | 4/1998 | Ugai et al. |
| 5,777,029 A | 7/1998 | Horrion et al. |
| 5,804,672 A | 9/1998 | Bolte et al. |
| 5,821,294 A | 10/1998 | Perlinski |
| 5,821,297 A | 10/1998 | Arnold et al. |
| 5,837,089 A | 11/1998 | Magrum |
| 5,840,823 A | 11/1998 | Licht et al. |
| 5,872,182 A | 2/1999 | Duan et al. |
| 5,905,113 A | 5/1999 | Licht et al. |
| 5,916,960 A | 6/1999 | Lum et al. |
| 6,306,942 B1 * | 10/2001 | McCarthy et al. .......... 524/195 |

FOREIGN PATENT DOCUMENTS

| | | |
|---|---|---|
| CA | 2121959 | 10/1994 |
| CZ | 261085 | 1/1989 |
| DE | 1 917 236 | 11/1970 |
| DE | 39 17 306 | 12/1990 |
| DE | 39 33 204 | 4/1991 |
| DE | 197 27 029 | 1/1999 |
| EP | 0 451 998 | 10/1991 |
| EP | 0 936 249 A1 | 8/1999 |
| GB | 2 124 239 | 2/1984 |
| JP | 50-3444 | 1/1975 |
| JP | 50-3446 | 1/1975 |
| JP | 50-22044 | 3/1975 |
| JP | 58-21470 | 2/1983 |
| JP | 60-36543 | 2/1985 |
| JP | 60-255875 | 12/1985 |
| JP | 61-283541 | 12/1986 |
| JP | 1-129083 | 5/1989 |
| JP | 2-20585 | 1/1990 |
| JP | 2-127491 | 5/1990 |
| JP | 4-164986 | 6/1992 |
| JP | 4-323292 | 11/1992 |
| JP | 8-199149 | 8/1996 |
| JP | 8-302315 | 11/1996 |
| JP | 10-195406 | 7/1998 |
| JP | 10-273587 | 10/1998 |
| JP | 11130913 | 5/1999 |
| JP | 11-151794 | 6/1999 |
| SK | 278 615 | 11/1997 |
| SU | 480259 | 6/1978 |
| SU | 852907 | 8/1981 |
| WO | WO 92/02568 | 2/1992 |
| WO | WO 94/13703 | 6/1994 |
| WO | WO 95/19403 | 7/1995 |
| WO | WO 97/19121 | 5/1997 |
| WO | WO 97/32805 | 9/1997 |

(List continued on next page.)

OTHER PUBLICATIONS

Karagezyan et al., Kozh–Obuvn. Prom–st. (1997) (2), pp. 35–36 (Eng. Abs.).

Ogandzhanyan et al., Arm. Khim. Zh. (1977), 30(6), pp. 458–464 (Eng. Abs.).

Ordukhanyan et al., Arm. Khim. Zh. (1988), 41(3), pp. 142–146 (Eng. Abs.).

(List continued on next page.)

Primary Examiner—Judy M. Reddick
(74) Attorney, Agent, or Firm—Scott A. Bardell

(57) ABSTRACT

The invention provides low temperature thermally activatable water-dispersed adhesive compositions and adhesives made from the compositions by removing water. The adhesive compositions of the invention comprise a mixture of low modulus crystallizing polyester polyurethane, acrylic ester copolymer, one or more hydrophobically-modified associative polyurethanes, and a stabilizer system comprising a combination of carbodiimide and branched primary amino alcohol.

19 Claims, No Drawings

FOREIGN PATENT DOCUMENTS

| | | |
|---|---|---|
| WO | WO 98/33602 | 8/1998 |
| WO | WO 98/55559 | 12/1998 |
| WO | WO 99/14278 | 3/1999 |
| WO | WO 99/14279 | 3/1999 |
| WO | WO 99/26993 | 6/1999 |
| WO | WO 99/48997 | 9/1999 |

OTHER PUBLICATIONS

Boshnyakova et al., Plast. Massy (1976), (8), pp. 41–42 (Eng. Abs.).

Oganesyan et al, Prom. Sin. Kauch. Nauch–Tekh. Sb. (1969), No. 7, pp. 9–12 (Eng. Abs. Only).

Karapetyan et al, Prom. Sin. Kauch., Nauch–Tekh. Sb. (1969), No. 4, pp. 12–14 (Eng. Abs. Only).

Kleps et al., "Investigation of the Influence of Metal Oxides on the Thermal Degradation of Chlorine–Containing Polymers by Thermogravimetry," *Journal of Thermal Analysis*, vol. 32 (1987), pp. 1785–1789.

Kleps et al., "Investigation of the Influence of Zinc Oxide on Thermal Degradation of Olychloroprene," *Journal of Thermal Analysis*, vol. 36 (1990), pp. 1213–1221.

Abdel–Razik, "Photostabilizing Effect of 5–Hydroxy–3–Phenyl–amino–1–Phenyl– 3:5–Dihydrobenzene Derivatives in Polychloroprene," *Journal of Polymer Science: Part A: Polymer Chemistry*, vol. 26, pp. 2359–2367 (1988).

Musch et al., "Polychloroprene Crosslinking for Improved Aging Resistance," *KGK Kautschuk Gummi Kunstoffe* 49, Jahngang, Nr. 5/96.

Al–Mehdawe et al., "Rubber–Bound Antioxidants. I. Amine Antioxidants Bound to Polychloroprene Rubber," *Rubber Chemistry and Technology*, vol. 62, pp. 13–32.

Al–Mehdawe et al., "Rubber Bound Antioxidants. II. Amine Antioxidants Bound with Polychloroprene Rubber," *J. Patrol. Res.*, vol. 7, No. 2 (1988), pp. 99–110.

Amano et al., "Studies on the Stabilization of Chloroprene Rubbers Part I Thermal Dehydrochlorination Studies by the pH Method," *UDC*, 678, 763:66, 081, pp. 45–50.

Gardner et al., "The Thermal Degradation of Polychloroprene–I / Thermal Analysis Studies of the Stability of Polychloroprene Samples, and Measurements of the Kinetics of Degradation," *European Polymer Journal*, 1971, vol. 7, pp. 569–591.

Juhasz et al., "Thermal study of chlorine–containing polymers. I. Direct determination of the 1,2–units of polychloroprenes by thermal dehydrochlorination," Muanyag es Gumi (1968), 5(10), pp. 381–385 (Eng. Abs.).

Technical Data Sheet: "Primary Amino Alcohols", TDS 10, (1998), ANGUS Chemical Company, Buffalo Grove, IL.

Technical Data Sheet: "AquaStik 198 1120", (1/97) 248348A, DuPont Dow Elastomers, Wilmington, DE.

Technical Data Sheet: "AquaStik™ Selection Guide", (7/96) 248347A, DuPont Dow Elastomers, Wilmington DE.

Technical Data Sheet: "AquaStik™ 2540", DuPont Dow Elastomers, Wilmington, DE.

"What is AQR–0033?" (Aug. 14, 1998), DuPont Dow Elastomers, Wilmington, DE (pp. 4–12).

Technical Information: "Adhesive Raw Materials—Acronal© A 310 S", (1996) BASF Corporation, Charlotte, NC.

Technical Data Sheet: BASF Introduces: *Luphen Polyester Urethane D DS 3507 For Technical Dry Bonding Applications, Luphen D DS 3507*, BASF Charlotte Technical Center, Charlotte, NC, Presented Feb. 1999.

Technical Brochure: "Dispercoll for the manufacture of adhesives", Bayer, pp. 1–17.

Technical Data Sheets: "DRT—resin dispersions for water–based adhesives", Les Dérivés Résiniques & Terpéniques S.A.

Technical Data Sheet: "Dermulsene DT 50" (May 10, 1998), Les Dérivés Résiniques & Terpéniques S.A.

Technical Data Sheets: "Dermulsene® in water based contact adhesives for foam bonding" applications, (Apr. 1999), Les Dérivés Résiniques & Terpéniques S.A.

Technical Data Sheets: "Hercules Chemical Specialties Product Data, Piccotex® LC–55WK Anionic, Pure Monomer Resin Dispersion", (Jul. 24, 1996), Hercules Incorporation, Wilmington, DE.

Technical Brochure: Tacolyn 5001 Resin Dispersion (Res A–2496), Hercules Chemical Specialties.

Technical Data Sheet: "Polyurethane Dispersions, Quilastic", Issue 5, (01/99), Merqunsa, Barcelona, Spain.

Technical Data Sheet: "Quilastic DEP–170 Provisional Data Sheet", Issue 3, (01/99), Merquinsa, Barcelona, Spain.

Technical Data Sheets: Quilastic DEP–172 Provisional Data Sheet, Issue 4, (01/99), Merquinsa, Barcelona, Spain.

Technical Brochure: Neoprene polychloroprene, "Basic Compounding of Neoprene Latex", NL–310.1, ADH–220.2, (9/96) 300609A, DuPont Dow Elastomers, Wilmington, DE.

Technical Brochure: "Urethane Additives Package", Rhein Chemie Corporation.

Technical Data Sheet: "HRJ–12573", UT01750 (6/99), Schenectady International Inc., Schenectady, NY.

Technical Data Sheet: HRJ–13130, UMO1630RI (2/95), Schenectady International Inc., Schenectady, NY.

Technical Data Sheet: "Durite AL 3029C", TDS AL, 3029C, (02/99), Borden Chemical—Canada.

Technical Data Sheet: "Durite AL 8405C", TDS AL, 8405C, (10/93), Borden Chemical—Canada.

\* cited by examiner

LOW TEMPERATURE THERMALLY ACTIVATED WATER-DISPERSED ADHESIVE COMPOSITIONS

FIELD OF THE INVENTION

This invention relates to water-dispersed adhesive compositions and particularly to water-dispersed adhesive compositions that form adhesives that can be thermally activated at low temperatures.

BACKGROUND OF THE INVENTION

In the manufacture of office or automobile seating, a fabric is typically bonded to a contoured foam surface. The cloth-covered foam may then also be bonded to a support material such as wood or plastic. The contoured foam is typically bonded to the fabric by an adhesive. The adhesive may be applied when the part is needed or may be applied, allowed to dry, and then bonded at a later time depending upon the characteristics of the particular adhesive.

Adhesives such as sprayable hot melts, solvent based adhesives, and water-based contact adhesives have been used for such applications. Sprayable hot melt adhesives typically require specialized spray and storage equipment and have a short open time. Hot melt adhesives may also require re-heating at relatively high temperatures, for example, 265° F.–350° F. (130° C.–177° C.) to re-melt the adhesive and form a bond. Solvent-based adhesives are available with a wide range of solvated polymers, including crystallizing polyurethanes. However, the use of materials containing organic solvents in the workplace has raised emission and exposure concerns.

Water-dispersed adhesives are known in the art. These adhesives have gained commercial success in general because they are typically easily applied to substrates and do not contain appreciable amounts of organic solvents.

However, water-dispersed adhesives currently available may not provide adequate adhesion to all substrates. One example of a substrate that can be difficult to bond is flexible foam, in particular, molded foam. Molded foams, typically made using urethanes, are difficult to bond because the surface of the foam is smooth and relatively non-porous and often has mold release residue dispersed about its surface. Such foams are generally more difficult to bond because the combination of a smooth surface and any additional mold-release residue provides a surface that has a lower surface energy than a foam that does not have a molded surface.

SUMMARY OF THE INVENTION

In one aspect, the present invention provides low temperature activatable water-dispersed adhesive compositions. The adhesive compositions of the invention comprise low modulus crystallizing polyester polyurethane, acrylic ester copolymer, one or more hydrophobically-modified associative polyurethanes, and a stabilizer system comprising a combination of carbodiimide and branched primary amino alcohol.

In another aspect, the invention provides adhesives made from the adhesive compositions described in this application.

The term "water dispersed" means that the carrier is primarily water. However, incidental organic solvents, such as those present in additives and commercially available components, may be present. Thus, the adhesive compositions of the invention are at least substantially free of organic solvents. Preferably, however, "water-dispersed" refers to a 100% water carrier.

The term "dispersion" encompasses any form of solid dispersed in a liquid medium including, for example, latexes, emulsions, colloidal suspensions, and the like.

The adhesive compositions or the adhesives of the invention contain no external plasticizer or zinc oxide. The adhesive compositions of the invention also preferably contain no polychloroprene resins or dispersions.

The term "plasticizer" as used herein means compounds from the following classes: phthalates including alkyl benzyl phthalates; adipates including dialkyl adipates; phosphates including alkyl aryl phosphates and triaryl phosphates; alkyl and aryl sulfonamides; and hydrogenated terphenyls.

The term "low temperature activatable adhesive" means adhesives of the invention that are capable of bonding substrates at a bondline temperature of as low as 43° C.

The term "low modulus" means a storage modulus (G') not more than $3 \times 10^6$ dynes/cm$^2$ at 60° C., and preferably not more than $1 \times 10^9$ dynes/cm$^2$ at 20° C., as measured by dynamic mechanical analysis (DMA) at a frequency of 1 Hertz.

The term "crystallizing polyester polyurethane" means a polyester polyurethane polymer that has at least one measurable glass transition temperature (Tg) above 20° C. as measured by DMA.

The term "adhesive composition" means a mixture of adhesive components dispersed in water. The term "adhesive" means a mixture of adhesive components wherein water has been removed.

The adhesives of the invention after coating onto a substrate may be formulated to be non-blocking at ambient temperature (23° C.), and then can be thermally activated to form a bond.

The adhesives of the invention also provide open times of at least 3 days at ambient conditions. The term "open time" means the time that an effective adhesive bond can still be made, after the adhesive has been applied to a substrate and dried.

Other advantages of the adhesive compositions of the invention include the adhesive compositions are sprayable, can be bonded at low pressures (1–3 psi (0.048–0.14 kPa)), provide high green strength durable bonds, that is, bonds that maintain or increase in bond strength and are environmentally resistant, for example, at 52° C. and 80% RH, for 48 hours, the adhesives can be bonded greater than 24 hours after drying (non-blocking), and the adhesive compositions of the invention have low penetration into porous surfaces.

DETAILED DESCRIPTION OF THE PREFERRED EMBODIMENTS

The water-dispersed adhesive compositions of the invention comprise one or more low modulus crystallizing polyester polyurethanes, acrylic ester copolymer, one or more hydrophobically-modified associative polyurethanes, and a stabilizer system. The water-dispersed adhesive compositions optionally, but preferably, contain one or more antioxidants.

Acrylic ester copolymer is generally present in the adhesive compositions of the invention in an amount of from about 60 to about 400 parts per 100 parts low modulus crystallizing polyester polyurethanes on a dry weight basis, or "phr urethane." Acrylic ester copolymer is preferably present in the adhesive compositions of the invention in an amount of from about 70 to about 230 phr urethane and more preferably present in an amount of from about 80 to about 160 phr urethane.

Hydrophobically-modified associative polyurethane is generally present in the adhesive compositions of the invention in an amount of from about 0.05 to about 2, preferably from about 0.07 to about 1, and more preferably from about 0.07 to about 0.5 phr urethane.

The adhesive compositions of the invention contain a stabilizer system. The stabilizer system is a combination of carbodiimide and branched primary amino alcohol. Carbodiimide is present in the adhesive compositions of the invention in an amount of from about 1 to about 8 phr, preferably from about 1.5 to about 7 phr, more preferably from about 2.0 to about 6.5 phr urethane. Branched primary amino alcohol is present in the adhesive compositions of the invention in an amount from about 1.5 to about 7 phr, preferably from about 2 to about 4 phr, more preferably from about 2.3 to about 3.5 phr urethane. Generally, the ratio of carbodiimide to branched primary amino alcohol ranges from about 2 to 0.5 to about 0.5 to 2 by weight with a ratio of about 2 to 1 preferred.

If present, antioxidant is provided in the adhesive composition of the invention in an amount of from about 1.5 to about 7.0, preferably, about 2.0 to about 5.0, more preferably, about 2.4 to about 2.8 phr urethane.

The water-dispersed adhesive compositions of the invention contain one or more low modulus crystallizing polyester polyurethane, preferably in the form of a water dispersion. The low modulus crystallizing polyester polyurethane provides the adhesives of the invention with high hot tack, a rapid crystallization rate resulting in high green strength, a high solids content (>50%), an extended bond range capability of at least 3 days, and moderate heat resistance. The low modulus crystallizing polyester polyurethane can either be carboxylated or sulfonated, but is preferably carboxylated. Low modulus crystallizing polyester polyurethanes can be generally made by methods described in PCT Publication WO 99/26993. Useful low modulus crystallizing polyester polyurethanes include those having the trade designations Dispercoll™ KA-8756 (Bayer) (G' @ 25° C.~1× $10^9$, @ 60° C.~1×$10^6$, @ 80° C.~9×$10^5$ dynes/cm$^2$); Neocryl™ 9617 (Neoresins Division of Avecia Inc.) (G' @ 25° C.~1×$10^8$, @ 60° C.~1×$10^6$, @ 80° C.~9×$10^5$ dynes/cm$^2$); and Quilastic™ DEP 170 (G' @ 25° C.~1×$10^9$, @ 60° C. 1×$10^6$, @ 80° C.~7×$10^5$ dynes/cm$^2$) and Quilastic™ DEP 172 (Merquinsa) (G' @ 25° C.~1×$10^9$, @ 60° C.~2×$10^6$, @ 80° C.~2×$10^6$ dynes/cm$^2$). All of the above storage modulus values are measured values using DMA at a frequency of 1 Hertz.

The acrylic ester copolymer enhances hot tack properties of the adhesive and acts as a compatibilizer for the low modulus crystallizing polyester polyurethane and the stabilizer system and other resins. Useful acrylic ester copolymers have a rubbery plateau modulus where the storage modulus (G') is not more than 8×$10^5$ dynes/cm$^2$ at 80° C. and 1×$10^6$ dynes/cm$^2$ at 50° C., and are preferably anionic. General teachings of how such acrylic ester copolymers are made can be found in U.S. Pat. Nos. 4,250,070 and 4,931,494, incorporated by reference herein. Commercially available acrylic ester copolymers useful in the water-dispersed adhesive compositions of the invention include Acronal® A-310 S (butyl acrylate/methyl methacrylate copolymer dispersion; Tg: −20° C.), Acronal® A-311 (butyl acrylate/methyl methacrylate copolymer dispersion; Tg: −20° C.) Acronal® V210 (vinyl acetate/2-ethylhexyl acrylate/styrene terpolymer dispersion; Tg: −40° C.), and Acronal® DS3505 (butylacrylate/styrene copolymer dispersion; Tg: −35° C.), available from BASF Corporation and Rhoplex™ CA-597 (Butyl acrylate/acid component dispersion; Tg: 5° C.) (Rohm and Haas). The acrylic ester copolymers having the tradenames Acronal(® A-310 S and A-311 are believed to be derived from a copolymer of butyl acrylate and methyl methacrylate and crosslinked with a dihydrazide.

The hydrophobically-modified associative polyurethanes of the adhesive compositions of the invention function primarily as rheology modifiers and provide a means of formulating to provide rapid recovery from shear thinning after application of the adhesive composition to a substrate. Hydrophobically-modified associative polyurethanes are added to the adhesive compositions so to provide adhesive compositions having near-Newtonian flow characteristics and an effective amount of a hydrophobically-modified associative polyurethane is that amount which provides an adhesive composition of the invention with Newtonian flow characteristics. HEUR (hydrophobically modified ethylene oxide -based urethane resins, a class of hydrophobically-modified polyurethanes), perform independent of adhesive composition pH. The hydrophobe groups interact with the dispersed polymer and any resin particles that are present in the adhesive composition to form weak associative complexes with other hydrophobe groups at the surface of the dispersed polymer particles. Some HEUR are capable of imparting near-Newtonian rheology. Commercially available hydrophobically-modified associative polyurethanes are in the form of dispersions and include those having the tradenames Nopco™ DSX 1514 and 1550 (Henkel Corporation, Ambler, Pa.); Alcogum™ N-300 (Alco Chemical, Chattanooga, Tenn.) and Acrysol™ RM-825, RM 1020, RM 8W (Rohm and Haas).

The adhesive compositions of the invention contain an effective amount of a stabilizer system. An "effective amount" of a stabilizer system means an amount of stabilizer system so to prevent either coagulation of the crystallizing polyester polyurethane or hydrolysis of any ester moieties of the crystallizing polyester polyurethane or other resins containing ester moieties. Hydrolysis of ester moieties of the crystallizing polyester polyurethane will cause the adhesive performance of the adhesive to decline. Such hydrolysis may be detected by a major shift in pH of the adhesive composition and by using analytical techniques such as Fourier Transform Infrared Spectroscopy (FTIR) gas chromatography, and mass spectrometry. The stabilizer systems of the adhesive compositions of the invention protect polyester groups in the polyurethane from hydrolysis in the adhesive composition and the adhesive. The stabilizer system of the adhesive compositions of the invention comprises a combination of branched primary amino alcohol and carbodiimide.

Branched primary amino alcohols act primarily as acid scavengers. The branched primary amino alcohols are derived from nitroparaffins by way of nitro alcohols. Useful branched primary amino alcohols are those which are miscible in water. Preferred branched primary amino alcohols include 2-amino-1-butanol; 2-amino-2-methyl-1,3-propanediol; 2-amino-2-methyl-1-propanol; 2-amino-2-ethyl-1,3-propanediol; and tris(hydroxymethyl) aminomethane and combinations thereof.

A carbodiimide as used herein is a compound containing the functional group: —N=C=N—. The carbodiimides are useful for preventing hydrolysis of functional groups such as ester groups. The carbodiimides may be aliphatic or aromatic. Useful carbodiimides are either miscible or dispersible in water. Preferred carbodiimides are those that are sterically hindered, water miscible, and contain little or no organic solvent. Preferred commercially available carbodiimides include Stabaxol® P 200 (reaction product of tetramethylxylene diisocyanate; water-dispersed), Stabaxol® P (poly(nitrilomethanetetraylnitrilo (2,4,6-tris(1-methylethyl)-1,3-phenylene)), and Stabaxol® I (tetraisopropyldiphenylcarbodiimide) (RheinChemie) and Ucarlnk® XL-29SE (Union Carbide, Danbury, Conn.). Both Stabaxol® P and I are useful in the compositions of the invention if first dispersed in water.

The adhesive compositions of the invention preferably, but optionally, contain one or more antioxidants. Useful antioxidants include Octolite™ 640, a 55% by weight solids emulsion blend 50:50 by weight of a polymeric hindered phenol and a thioester; Octolite™ 561, a 50% by weight solids dispersion of 4,4'-butylidenebis(6-t-butyl-m-cresol); Octolite™ 544, a 55% by weight solids dispersion of N,N'-di-beta-napthyl-p-phenylenediamine; Octolite™ 504, a 50% by weight solids dispersion of 2,2'-methylenebis(6-t-butyl-p-cresol); Octolite™ 485, a 46% by weight solids dispersion of Bisphenol antioxidant, an anionic emulsion of Uniroyal's Naugawhite Liquid); Octolite™ 424, a 63% by weight solids emulsion blend 50:50 by weight of a polymeric hindered phenol and di-tridecylthiodipropionate (DTDTDP) thioester; Octolite™ AO-50, a 50% by weight solids emulsion of a hindered phenol and DTDTDP thioester; Octolite™ AO-28, a 63% by weight solids emulsion blend 80:20 of a polymeric hindered phenol and DTDTDP thioether; and Octolite™ WL, a 50% by weight solids emulsion of butylated reaction product of para-cresol and dicyclopentadiene, all available from Tiarco Chemical Division, Textile Rubber and Chemical Company, Inc., Dalton, Ga.

The thermal resistance of the adhesives of the invention may be further increased by adding one or more water-dispersed or water dispersible isocyanates to the adhesive compositions of the invention. As used herein "isocyanates" include both blocked and unblocked isocyanates. Examples of useful isocyanates include Desmodur™ DA, KA 8703, and BL-116 (Bayer, Pittsburgh, Pa.); Trixene™ BI 7986 (Baxenden Chemicals, Baxenden, England); and HD-100 (Lyondell Chemical, Newtown Square, Pa.). Generally, if present, isocyanates may be present in the adhesive compositions at levels of about 1 to about 7.5% by dry weight of the water based composition, with a level of from 3 to 5% by dry weight of the composition being preferred. Additionally, water-dispersible dihydrazide containing materials, water-dispersible epoxy resins, and water dispersible silanes may be used to enhance thermal resistance of the adhesives made from the adhesive compositions of the invention.

The water-dispersed adhesive compositions of the invention may also include one or more additional rheology modifiers in addition to hydrophobically-modified associative polyurethanes to control the flow of the adhesive composition. Rheology modifiers are added to the adhesive compositions so to provide adhesive compositions having near-Newtonian flow characteristics and an effective amount of a rheology modifier is that amount which provides an adhesive composition of the invention with near-Newtonian flow characteristics. Useful rheology modifiers include alkali soluble or swellable emulsions such as Acrysol™ ASE-60, ASE-75, and ASE-95NP, Acusol™ 810A (Rohm and Haas) and Alcogum™ L-15, L-131, and L-37 (Alco Chemical), alkali soluble associative emulsions such as Alcogum™ SL-70, and 78 (Alco Chemical) or Acrysol™ TT-935 or RM-5 (Rohm and Haas), and alkali swellable associative urethanes such as Polyphobe™ P-104, and P-106 (Union Carbide, Cary, N.C.), and combinations thereof.

Pigments may be added to color the adhesive compositions. Suitable pigments are available as powders, which are water dispersible, or as aqueous dispersions. Some suitable pigments include Phthalocyanine Green and Blue Pigment aqueous dispersion (Hilton Davis Chemical Co., Cincinnati, Ohio), Akrosperse™ Calcium 2B red aqueous dispersion (Akrochem Corporation, Akron, Ohio), and Carbon Black™ aqueous dispersion (Technical Industries Inc., Peace Dale; R.I.), and combinations thereof.

The adhesive compositions of the invention may also contain other conventional additives such as adhesion promoters. A preferred silane adhesion promoter is Silquest™ Coatosil™ 1770 (beta-(3,4-epoxycyclohexyl)ethyltriethoxysilane) or Silquest™ Y-15078 (gamma-glycidoxypropylmethyldiethoxysilane), both available from CK Witco Corporation, Tarrytown, N.Y.

The adhesive compositions of the invention may also contain fillers such as glass or polymeric beads or bubbles (expanded or unexpanded), thermally conductive particles, electrically conductive particles, and the like.

The adhesive compositions can be made by first combining the acrylic ester copolymer with a branched primary amino alcohol and then adding the crystallizing polyester polyurethane, followed by the remaining ingredients. The order is specific because the branched primary amino alcohol acts as a buffer for the lower pH acrylic ester copolymer. Normally, low shear mixing equipment can be used. In the instance where the acrylic ester copolymer does not require buffering, for example, Acronal® A-310 S, then the acrylic ester copolymer is combined with any optional rheology modifier, and then adding the crystallizing polyester polyurethane, branched primary amino alcohol, and the remaining ingredients.

The adhesive compositions of the invention can be applied to one or both surfaces of the substrates to be bonded. The preferred adhesive compositions are preferably applied to a substrate by spraying. However, adhesive compositions of the invention may also be applied by conventional means, such as brush, paint roller, or roll coater provided that the adhesive composition has the appropriate viscosity. The adhesive compositions of the invention may also be applied to release liners and dried to form self-supporting films that can be die cut into any desired shape. Adhesive compositions of the invention may be dried at room or elevated temperatures.

The adhesive compositions of the invention can also be applied over the same or another applied adhesive so as to form a multilayer construction.

Once the adhesive compositions of the invention have been applied to a substrate and dried, the resulting adhesives of the invention may be bonded by contacting the dried adhesive to another substrate to be bonded (the second substrate coated or not coated with adhesive of the invention) and heating the adhesive to a bondline temperature of at least 43° C. and, preferably, from about 45 to about 49° C. The bonded assembly is held in place for about 25–45 seconds. Heat may be applied to the adhesive/substrate combination by any means such as hot press, heat gun, heat lamps, oven, conformable heated fluidized bed such as a waterbed or bed of flowable particles, heated bladder press, or a steam press.

Examples of substrates that can be bonded include open and closed cell foams, skin or molded polyurethane foams, wood, fabrics, metals, and plastics. Examples of foams include polyurethanes, polystyrenes, polychloroprenes, and the like. Specific examples of fabrics include those made from acrylics, vinyls, leathers, cottons, nylons, polyesters, rayons, and the like. Specific plastics include polyvinyl chlorides, acrylonitrile/butadiene/styrenes, high impact polystyrenes, and blends thereof containing for example polycarbonates, and the like.

Index of Abbreviations

| Abbreviation | Tradename | Description |
|---|---|---|
| Polyester Polyurethane | | |
| DEP170 | Quilastic ™ DEP 170 | Carboxylated polyester polyurethane dispersion, G' @25° C. ~ 1 × $10^9$, @ 0° C. 1 × $10^6$, @80° C. ~ 7 × $10^5$ dynes/cm², available from Merquinsa Corporation, Barcelona, Spain |
| Acrylic ester copolymer | | |
| A310S | Acronal ® A 310S | Butyl Acrylate/Methylmethacrylate copolymer dispersion with hydrazide functionality, Tg −20° C., available from BASF Corporation, Toronto, Ontario |
| V210 | Acronal ® V210 | Vinyl acetate/2-Ethylhexylacrylate/Styrene terpolymer dispersion, Tg −40° C., available from BASF Corporation, Toronto, Ontario |
| V275 | Acronal ™ V275 | Butyl acrylate/Vinyl Acetate/Styrene terpolymer dispersion, Tg −40° C., available from BASF Corporation, Toronto, Ontario |
| DS3505 | Acronal ™ DS 3505 | Butyl acrylate/Styrene copolymer dispersion, Tg −35° C., available from BASF Corporation, Toronto, Ontario |
| CA597 | Rhoplex ™ CA-597 | Butyl acrylate/acid component copolymer dispersion, Tg −5° C., available from Rohm & Haas, Philadelphia, PA |
| Stabilizer | | |
| P200 | Stabaxol ™ P 200 | Water-dispersible carbodiimide, available from RheinChemie, Trenton, NJ |
| Trisamino | Tris(hydroxymethyl) aminomethane | Neat, available from Angus Chemical Company, Buffalo Grove, IL |
| Miscellaneous Additives | | |
| Ol 640 | Octolite ™ 640 | Antioxidant which is an emulsion blend of 50:50 by weight polymeric hindered phenol and thioester, available from Tiarco Chemical Division, Dalton, GA |
| RM1020 | Acrysol ™ RM-1020 | Hydrophobically-modified associative ethylene oxide urethane dispersion, available from Rohm and Haas, Philadelphia, PA |
| RM8W | Acrysol ™ RM8W | Hydrophobically-modified associative polyurethane dispersion, available from Rohm and Haas, Philadelphia, PA |

EXAMPLES

The invention will be further illustrated by the following examples, which are illustrative of specific modes of practicing the invention, and are not intended as limiting the scope of the appended claims.

Unless otherwise stated, all percentages are percentages by dry weight and those percentages applying to adhesive compositions are by dry weight of the total amount of adhesive component.

Parts per hundred (phr), unless otherwise stated, are also parts per 100 parts of the dry weight of the carboxylated polyurethane component.

Dashes in the tables indicate that no value was noted or that an ingredient was not present.

Unless otherwise stated, all components were added in the form of dispersions (that is, in water).

Test Procedures

Elevated Temperature Stability

This test is intended to give an indication of long-term stability at room temperature of a particular composition by subjecting it to elevated temperature.

A composition of the invention is prepared, sealed in a 60 mL polyethylene bottle that was half filled and placed in an air-circulating oven at 122° F. (50° C.). After various time intervals, the composition is removed from the oven, conditioned at room temperature for 3 to 4 hours, and tested for pH using an Orion Model 710A pH meter, available from Orion, Research Inc., Beverly, Mass.

In addition, the composition is inspected using a wooden applicator stick to see the extent the composition has coagulated, which includes congealed, curdled, separated, settled, or formed non-easily mixable or non-easily dispersible layers. The percent (%) coagulation is estimated by the depth of the wooden applicator stick compared to the total depth of the composition in the bottle. The % coagulation and elapsed time period is reported. It is preferred that the composition has 0% coagulation for at least 4 weeks.

Room Temperature, T-Peel Strength, Foam to Fabric

In this test, the adhesive strength of a composition is determined for bonded parts of foam to fabric.

A 3 inch×3 inch (7.6 cm×7.6 cm) piece of foam (either open cell polyurethane foam, Q41), available from Dickerts of London, London, Ontario, Canada or molded polyurethane foam, available from Woodbridge Foam Corp., Woodbridge, Ontario, Canada, and a 4 inch×6 inch (10.2 cm×15.2 cm) piece of open weave, polyester blend, acrylic backed fabric (Lansing Ocean, available from Dickerts of London, London, Ontario, Canada) are each evenly sprayed with the adhesive composition to be tested using a Critter spray gun to a coating weight of 2 to 3 g/0.09 m² (2 to 3 g/ft²).

The foam and the fabric are allowed to dry at ambient conditions for 2 hours, i.e., open time of two hours, unless otherwise stated. The adhesive coated side of the fabric is then placed on the adhesive coated side of the foam and a hot water bottle, that has been heated to 158° F. (70° C.) for at least two hours, is placed on top of the fabric/foam bonded test assembly and weighted down with a 5 pound (2.3 kg) weight attached to a piece of plastic for approximately 20–25 seconds so that the bondline temperature reaches approximately 113° F. (45° C.). The bondline temperature was measured using Thermolabel™ Temperature Sensitive Tape, available from Paper Thermometer Co. Inc., Greenfield, N.H. The bonded assembly is then conditioned at ambient temperature for 24 hours before hand peeling the fabric from the foam along one side. The bond strength is assigned a rating according to the following:

5=strong bond; total (>80%) foam tear over the total bonded area
4=strong bond; partial (1–80%) foam tear
3=strong bond; no (0%) foam tear
2=moderate bond; no (0%) foam tear
1=slight bond; no (0%) foam tear
0=no bond The reported value in the Tables is for one replicate of each adhesive composition tested.

T-Peel Strength After Environmental Exposure, Foam to Fabric

In this test, the effectiveness of bonding of an adhesive composition after exposure to an elevated temperature of 126° F. (52° C.) and 80% Relative Humidity (RH) for 48 hours is determined.

The foam/fabric test assemblies after being used for determining "Room Temperature, T-Peel Strength, Foam to Fabric" above, are utilized for determining T-Peel Strength after exposure to hot, moist conditions.

The bonded test assemblies are put in an environmental chamber at 126° F. (52° C.) and 80% RH for 48 hours. The assemblies are removed from the chamber and conditioned at room temperature for 24 hours.

Each of the test assemblies is then tested using the procedure of the test method "Room Temperature, T-Peel Strength, Foam to Fabric".

Room Temperature T-Peel Strength, Twill to Twill

In this test, the adhesive strength of a composition is determined for bonded parts of cotton twill to itself.

Two pieces of cotton twill (available from Rosetrim of Toronto, Ontario, Canada) one inch (2.54 cm) wide and approximately 20 inches (50 cm) long are each coated with four (two+two) thin (3–4 g/0.09 m² dry coating weight) layers of the composition being tested with 10 minutes dry time between the first two coats and the second two coats using a one inch (2.54 cm) wide paint brush. After 1.5 to 2 hours at room temperature, i.e., open time, the two pieces are placed in an air circulating oven at 158° F. (70° C.) for 20 minutes. The coated pieces are removed from the oven and immediately mated, coated side to coated side, and rolled down with a steel roller.

The bonded sample is left at room temperature for 4 days. The two free ends of the bonded sample are peeled apart by hand to a point where the adhesive composition covers the total one inch (2.54 cm) width of the twill, the ends are clamped in the jaws of an INSTRON tensile testing machine, and the bonded sample is tested at a separation rate of 2 inches (50 mm) per minute for a distance of about 3.5 inches (8.9 cm).

The force required to peel the two pieces of twill apart is measured as an average force recorded over the bonded area tested. The force is recorded in Newtons per inch width and converted to pounds per inch width (piw) and kiloNewtons per meter (kN/m). The reported value in the Tables is the average of two replicates for each composition tested.

Heat Resistance, Twill to Twill

In this test, the effectiveness of bonding of a composition to support a 0.44 pound (200 gram) weight at elevated temperature is determined.

The twill/twill test samples after being used for determining "Room Temperature T-Peel Strength, Twill to Twill" above, are utilized for determining heat resistance.

A mark is made on the twill/twill test sample from above to indicate the beginning of the bonded area. One free end of the test sample is suspended from a rack in an air-circulating oven. A 0.44 pound (200 gram) weight is fastened to the remaining free end of the test sample and the temperature of the oven is set to 104° F. (40° C.). After 1 hour, the bond separation (i.e., the distance that the bond has released) is measured and a second mark is made on the sample to indicate this point as the start of the bonded area for next test segment. The temperature of the oven is increased to 113° F. (45° C.), held constant for 1 hour, and the bond separation is measured from the second mark. A third mark is made on the sample to indicate the start of the bonded area. The test is continued wherein the temperature of the oven is increased in 9° F. (5° C.) increments, holding the temperature constant for 1 hour for each increment, and measuring the bond separation until separation exceeds one inch (25 mm).

The temperature at which the separation of greater than one inch (25 mm) is considered to be the failure temperature for that composition.

Room Temperature 180° Peel Strength, Substrate to Twill

In this test, the effectiveness of bonding of a composition is compared for various substrates bonded to cotton twill.

Bonded samples are prepared according to the procedure outlined in "Room Temperature T-Peel Strength, Twill to Twill" test method above except that 0.125 inch thick×1.375 inches wide×12 inches long (0.32 cm×3.5 cm×30.5 cm) plywood available from Hutton Woodworking, London, Ontario, Canada, 0.045 inch thick×1.5 inches wide×12 inches long (0.11 cm×3.8 cm×30.5 cm) phosphate coated steel (CRS), available from Advanced Coatings Technologies, Hillsdale, Mich., or 0.125 inch thick×1.375 inches wide×12 inches long (0.32 cm×3.5 cm×30.5 cm) acrylonitrile-butadienetyrene (ABS), available from Parker Plastics, London, Ontario, Canada, in place of the second piece of twill.

The test sample is clamped into the jaws of an INSTRON Model 4400R tensile testing machine, using Series IX software, and tested at a crosshead speed of 2 inches (50 mm) per minute for a distance of about 3.5 inches (8.9 cm). The force required to peel back the fabric (in a direction 180° to the bond line) is recorded in pounds per inch width (piw) and converted to kilonewtons per meter (kN/m). The reported value in the Tables is the average of two replicates for each composition tested.

180° Peel Strength after Environmental Exposure, Substrate to Twill

In this test, the effectiveness of bonding of a composition is compared for various substrates bonded to cotton twill after exposure to an elevated temperature of 126° F. (52° C.) and 80% RH for 48 hours.

The steel/twill test samples after being used for determining "Room Temperature 180° Peel Strength, Substrate to Twill" above, are utilized for determining peel strength after exposure to hot, moist conditions.

The test samples are put in an environmental chamber at 126° F. (52° C.) and 80% RH for 48 hours. The samples are removed from the chamber and conditioned at room temperature for 24 hours.

Each of the test samples is then tested using the procedure of the test method "Room Temperature 180° Peel Strength, Substrate to Twill".

Time Based Storage Modulus (G') by Dynamic Mechanical Analysis (DMA)

A wet film of adhesive composition or polymer is cast onto a polyester film. The adhesive film on the polyester film is dried at room temperature for 20 hours, then placed in an air circulating oven at 194° F. (90° C.) for 30 minutes, conditioned at ambient temperature for up to 24 hours, followed by 131° F. (55° C.) for a minimum of 30 minutes. The sample is removed from the oven, the polyester film is stripped off, and the dried adhesive film is immediately tested using a Rheometrics brand DMA. Measurement of G' is made at 1 Hertz (Hz) from initial to final value (constant value) at various time intervals. The percent increase in G' over the initial (i.e., 0 minutes) for each time interval is calculated and reported. The maximum G' value attained is also reported. It is desirous that G' reaches its maximum value in the minimum time.

Examples 1–7

In these examples, the effect of varying the ratio of acrylic ester copolymer (A310S) to polyester polyurethane (DEP170) at two levels of carbodiimide (P200) in the compositions of the invention is demonstrated.

Seven adhesive compositions of the invention were prepared by combining the components of Table 1 in the following order: A310S, RM1020, DEP170, Trisamino, O1640, P200. In addition to the components listed in Table 1, each composition contained 100 parts DEP170.

TABLE 1

| | Phr Based On 100 Parts By Weight DEP170 | | | | | | |
|---|---|---|---|---|---|---|---|
| Component | Ex. 1 | Ex. 2 | Ex. 3 | Ex. 4 | Ex. 5 | Ex. 6 | Ex. 7 |
| A310S | 400 | 233 | 150 | 150 | 150 | 122 | 122 |
| O1640 | 6.65 | 4.50 | 3.68 | 3.35 | 3.34 | 2.98 | 2.99 |
| P200 | 6.55 | 4.22 | 3.55 | 3.19 | 6.47 | 2.84 | 5.78 |
| Trisamino | 6.34 | 4.22 | 3.49 | 3.17 | 3.16 | 2.82 | 2.83 |
| RM1020 | — | — | — | 0.34 | 0.34 | 0.30 | 0.30 |
| Ratio of A310S:DEP170 | 80:20 | 70:30 | | 60:40 | | 55:45 | |

The adhesive compositions were tested on open cell foam and molded foam for foam to fabric T-Peel Strength at room temperature (RT) and after environmental exposure (ENV) according to the test methods outlined above. The foam substrate used and T-Peel Strength rating results are given in Table 2.

TABLE 2

| | | T-Peel Strength Rating | |
|---|---|---|---|
| Ex. No. | Foam Substrate | RT | ENV |
| 1 | Open cell | 2 | 2 |
| 2 | Open cell | 2 | 2 |
| 3 | Open cell | 2 | 2 |
| 4 | Open cell | 2.5 | 3 |
|   | Molded | 4 | 5 |
| 5 | Open cell | 2.5 | 2 |
| 6 | Open cell | 2.5 | 2 |
|   | Molded | 5 | 5 |
| 7 | Open cell | 3 | 1.5 |
|   | Molded | 5 | 5 |

In addition, the adhesive compositions (each composition prepared at approximately 50% by weight solid content) were tested for elevated temperature stability according to the test method "Elevated Temperature Stability" previously described except that % coagulation was not measured because the samples did not coagulate over the test period. The time intervals and pH results are in Table 3 below.

TABLE 3

| Ex. No. | pH | | | | | | | |
|---|---|---|---|---|---|---|---|---|
|  | 0 wks | 1 wk | 2 wks | 3 wks | 4 wks | 5 wks | 6 wks | 7 wks | 8 wks |
| 1 | 7.66 | — | — | 7.58 | 7.58 | 7.45 | — | 7.36 | 7.26 |
| 2 | 7.73 | — | — | 7.65 | 7.65 | 7.51 | — | 7.39 | 7.24 |
| 3 | 8.01 | — | — | 7.89 | 7.90 | 7.69 | — | 7.60 | 7.44 |
| 4 | 7.95 | 7.96 | 8.00 | 7.82 | — | 7.77 | 7.56 | — | — |
| 5 | 7.87 | 8.02 | 8.02 | 7.88 | — | 7.81 | 7.68 | — | — |
| 6 | 8.06 | 8.05 | 8.10 | 7.93 | — | 7.83 | 7.68 | — | — |
| 7 | 7.92 | 8.09 | 8.09 | 7.96 | — | 7.88 | 7.76 | — | — |

Examples 8–19

In these examples, the effect of varying the ratio of acrylic ester copolymer (V210) to polyester polyurethane (DEP170) at two levels of carbodiimide (P200) in the compositions of the invention is demonstrated.

Twelve adhesive compositions of the invention were prepared by combining the components of Tables 4 and 5 in the following order: V210, Trisamino, DEP 170, RM8W, O1640, P200. In addition to the components listed in the Tables, each composition contained 100 parts DEP170.

TABLE 4

| | Phr Based On 100 Parts By Weight DEP170 | | | | | |
|---|---|---|---|---|---|---|
| Component | Ex. 8 | Ex. 9 | Ex. 10 | Ex. 11 | Ex. 12 | Ex. 13 |
| V210 | 400 | 233 | 150 | 150 | 150 | 150 |
| O1640 | 5.89 | 3.89 | 3.08 | 3.38 | 3.38 | 3.37 |
| P200 | 5.79 | 3.69 | 2.98 | 3.22 | 3.22 | 6.44 |
| Trisamino | 5.69 | 3.65 | 2.93 | 3.17 | 3.17 | 3.16 |
| RM8W | — | — | — | — | 0.18 | 0.18 |
| Ratio of V210:DEP170 | 80:20 | 70:30 | | 60:40 | | |

TABLE 5

| | Phr Based On 100 Parts By Weight DEP170 | | | | | |
|---|---|---|---|---|---|---|
| Component | Ex. 14 | Ex. 15 | Ex. 16 | Ex. 17 | Ex. 18 | Ex. 19 |
| V210 | 122 | 122 | 122 | 100 | 100 | 100 |
| O1640 | 2.98 | 2.98 | 2.97 | 2.68 | 2.68 | 2.67 |
| P200 | 2.84 | 2.84 | 5.75 | 2.56 | 2.56 | 5.18 |
| Trisamino | 2.82 | 2.82 | 2.81 | 2.56 | 2.56 | 2.55 |
| RM8W | — | 0.16 | 0.16 | — | 0.15 | 0.15 |
| Ratio of V210:DEP170 | | 55:45 | | | 50:50 | |

The adhesive compositions were tested on open cell foam and molded foam for foam to fabric T-Peel Strength at room temperature (RT) and after environmental exposure (ENV) according to the test methods outlined above. The foam substrate used and T-Peel Strength rating results are given in Table 6.

TABLE 6

| | | T-Peel Strength Rating | |
|---|---|---|---|
| Ex. No. | Foam Substrate | RT | ENV |
| 8 | Open cell | (1) | — |
| 9 | Open cell | 3.75 | 3 |
| 10 | Open cell | 3.5 | 2 |
| 11 | Open cell | 3.5 | 3.5 |
|    | Molded | 3.5 | 4 |
| 12 | Open cell | 3.75 | 3.75 |
|    | Molded | 5 | 5 |
| 13 | Open cell | 4.5 | 4 |
|    | Molded | 5 | 5 |
| 14 | Open cell | 3.75 | 3.5 |
|    | Molded | 5 | 5 |
| 15 | Open cell | 3.75 | 3.75 |
| 16 | Open cell | 4 | 3 |
| 17 | Open cell | 5 | 3.5 |
|    | Molded | 5 | 5 |

TABLE 6-continued

| | | T-Peel Strength Rating | |
|---|---|---|---|
| Ex. No. | Foam Substrate | RT | ENV |
| 18 | Open cell | 3.75 | 3.75 |
|    | Molded | 1 | 5 |
| 19 | Open cell | 4.5 | 3 |
|    | Molded | 5 | 5 |

(1) Composition coagulated at room temperature and could not be tested.

In addition, the adhesive compositions (each composition prepared at approximately 50% by weight solid content) were tested for elevated temperature stability according to the test method "Elevated Temperature Stability" previously described. The time intervals, pH, and % coagulation results are in Table 7 below. Example 8 coagulated after 4 days at room temperature. Examples 9 and 10 coagulated after 3 weeks at room temperature. No data was taken at 4 weeks.

TABLE 7

| | pH, % Coagulation | | | | | |
|---|---|---|---|---|---|---|
| Ex. No. | 0 wks | 1 wk | 2 wks | 3 wks | 5 wks | 6 wks |
| 11 | 7.70 | 7.61 | 7.51 | 7.29 | 7.02 | 6.90 |
| 12 | 7.50 | 7.46 | —, 100% | — | — | — |
| 13 | 7.87 | 8.02 | —, 100% | — | — | — |
| 14 | 7.78 | 7.68 | 7.62 | 7.42 | 7.12 | 6.99 |
| 15 | 7.64 | 7.58 | 7.42 | 7.20 | 6.87 | —, 50% |
| 16 | 7.64 | 7.73 | —, 100% | — | — | — |
| 17 | 7.86 | 7.78 | 7.73 | 7.50 | 7.27 | 7.02 |
| 18 | 7.82 | 7.81 | 7.64 | 7.45 | —, 30% | — |
| 19 | 7.75 | 7.87 | 7.73 | 7.52 | —, 30% | — |

Examples 20–28

In these examples, the effect of varying the ratio of acrylic ester copolymer (DS3505) to polyester polyurethane (DEP170) at two levels of carbodiimide (P200) in the compositions of the invention is demonstrated.

Nine adhesive compositions of the invention were prepared by combining the components of Tables 8 and 9 in the following order: DS3505, Trisamino, DEP170, RM8W, O1640, P200. In addition to the components listed in the Tables, each composition contained 100 parts DEP170.

TABLE 8

| | Phr Based On 100 Parts By Weight DEP170 | | | | |
|---|---|---|---|---|---|
| Component | Ex. 20 | Ex. 21 | Ex. 22 | Ex. 23 | Ex. 24 |
| DS3505 | 400 | 233 | 150 | 150 | 150 |
| O1640 | 6.65 | 4.5 | 3.68 | 3.35 | 3.34 |
| P200 | 6.55 | 4.22 | 3.55 | 3.19 | 6.47 |
| Trisamino | 6.34 | 4.22 | 3.49 | 3.17 | 3.16 |
| RM8W | — | — | — | 0.18 | 0.18 |
| Ratio of DS3505:DEP170 | 80:20 | 70:30 | | 60:40 | |

TABLE 9

| | Phr Based On 100 Parts By Weight DEP170 | | | |
|---|---|---|---|---|
| Component | Ex. 25 | Ex. 26 | Ex. 27 | Ex. 28 |
| DS3505 | 122 | 122 | 100 | 100 |
| O1640 | 2.98 | 2.99 | 2.66 | 2.67 |
| P200 | 2.84 | 5.78 | 2.58 | 5.13 |
| Trisamino | 2.82 | 2.83 | 2.56 | 2.55 |
| RM8W | 0.16 | 0.16 | 0.15 | 0.15 |
| Ratio of DS3505:DEP170 | 55:45 | | 50:50 | |

The adhesive compositions were tested on open cell foam and molded foam for foam to fabric T-Peel Strength at room temperature (RT) and after environmental exposure (ENV) according to the test methods outlined above. The foam substrate used and T-Peel Strength rating results are given in Table 10.

TABLE 10

| | | T-Peel Strength Rating | |
|---|---|---|---|
| Ex. No. | Foam Substrate | RT | ENV |
| 20 | Open cell | 1.5 | 1.5 |
| 21 | Open cell | 2.5 | 1.5 |
| 22 | Open cell | 3 | 2 |
| 23 | Open cell | 2.5 | 2.5 |
|    | Molded | 5 | 5 |
| 24 | Open cell | 2.5 | 3 |
|    | Molded | 4 | 4.5 |
| 25 | Open cell | 3 | 2.5 |
| 26 | Open cell | 2.75 | 2 |
| 27 | Open cell | 3 | 3 |
|    | Molded | 4 | 5 |
| 28 | Open cell | 2.75 | 3 |
|    | Molded | 5 | 5 |

In addition, the adhesive compositions (each composition prepared at approximately 50% by weight solid content) were tested for elevated temperature stability according to the test method "Elevated Temperature Stability" previously described. The time intervals, pH, and % coagulation results are in Table 11 below. Example 20 coagulated after 4 days at room temperature. Examples 21 and 22 coagulated after 3 weeks at room temperature. No data was taken at 4 weeks.

TABLE 11

| | pH, % Coagulation | | | | | |
|---|---|---|---|---|---|---|
| Ex. No. | 0 wks | 1 wk | 2 wks | 3 wks | 5 wks | 6 wks |
| 23 | 6.71 | 6.74 | 6.77 | 6.67 | 6.56 | 6.49 |
| 24 | 6.72 | 6.71 | 6.81 | 6.72 | 6.64 | 6.59 |
| 25 | 6.84 | 6.87 | 6.91 | 6.82 | 6.69 | 6.58 |
| 26 | 6.84 | 6.91 | 6.95 | 6.86 | 6.78 | 6.65 |
| 27 | 7.03 | 7.06 | 7.09 | 6.98 | —, 100% | — |
| 28 | 7.07 | 7.14 | 7.17 | 7.05 | 6.97 | 6.84 |

Examples 29–38 and Comparative Example C-1

In these examples, ten adhesive compositions of the invention were prepared by combining the components of Tables 12 and 13 in the following order: Examples 29 and 30, as described in Examples 1–7; Examples 31–34, as described in Examples 20–28 substituting either CA597 or V275 in place of DS3505; Examples 35–36, as described in Examples 8–19; and Examples 37–38, as described in Examples 20–28.

In addition to the components listed in the Tables, each composition contained 100 parts DEP170. Comparative Example 1 was Cegex™ water glue, a polyester urethane water based adhesive, pH 7.59,% solid content 44.36, available from Cegex Systems, Albias, France.

TABLE 12

| | Phr Based On 100 Parts By Weight DEP170 | | | | |
|---|---|---|---|---|---|
| Component | Ex. 29 | Ex. 30 | Ex. 31 | Ex. 32 | Ex. 33 |
| A310S | 100 | 100 | — | — | — |
| CA597 | — | — | 100 | 100 | — |
| V275 | — | — | — | — | 100 |
| O1640 | 2.68 | 2.68 | 2.68 | 2.67 | 2.68 |
| P200 | 2.58 | 5.16 | 2.56 | 5.16 | 2.58 |
| Trisamino | 2.54 | 2.53 | 2.54 | 2.55 | 2.54 |
| RM1020 | 0.27 | 0.27 | — | — | — |
| RM8W | — | — | 0.15 | 0.15 | 0.15 |
| Ratio of Component: DEP170 | A310S, 50:50 | | CA597, 50:50 | | V275, 50:50 |

TABLE 13

| | Phr Based On 100 Parts By Weight DEP170 | | | | |
|---|---|---|---|---|---|
| Component | Ex. 34 | Ex. 35 | Ex. 36 | Ex. 37 | Ex. 38 |
| DS3505 | — | — | — | 100 | 100 |
| V275 | 100 | — | — | — | — |
| V210 | — | 100 | 100 | — | — |
| O1640 | 2.67 | 2.68 | 2.67 | 2.68 | 2.67 |
| P200 | 5.18 | 2.58 | 5.16 | 2.58 | 5.16 |
| Trisamino | 2.55 | 2.54 | 2.53 | 2.54 | 2.55 |
| RM8W | 0.15 | 0.15 | 0.15 | 0.15 | 0.15 |
| Ratio of Component: DEP170 | V275, 50:50 | | V210, 50:50 | | DS3505, 50:50 |

The adhesive compositions of Examples 29, 30, and 35–38 were tested on open cell foam and molded foam for foam-to-fabric T-Peel Strength at room temperature (RT) and after environmental exposure (ENV) according to the test methods outlined above. In the Table below, Example 29a is a remake of Example 29 and Example 30a is a remake of Example 30. The foam substrate used, the Open Time, and T-Peel Strength rating results are given in Table 14.

TABLE 14

| | | | T-Peel Strength Rating | |
|---|---|---|---|---|
| Ex. No. | Foam Substrate | Open Time | RT | ENV |
| 29 | Open cell | 2 hrs | 4.5 | 3 |
| | Molded | 2 hrs | 5 | 5 |
| 29a | Open cell | 2 hrs | 2.75 | 2.5 |
| | | 4 hrs | 3.75 | 2 |
| | | 2 days | 3 | 2.5 |
| | | 3 days | 3 | 2 |
| | Molded | 2 hrs | 4.5 | 4 |
| | | 4 hrs | 4.5 | 3.5 |
| | | 2 days | 5 | 3.5 |
| | | 3 days | 5 | 3.5 |
| 30 | Open cell | 2 hrs | 2.5 | 1.5 |
| 30a | Open cell | 2 hrs | 4 | 2 |
| | | 4 hrs | 4 | 2 |
| | | 2 days | 3.75 | 2 |
| | | 3 days | 3.5 | 2 |

TABLE 14-continued

| | | | T-Peel Strength Rating | |
|---|---|---|---|---|
| Ex. No. | Foam Substrate | Open Time | RT | ENV |
| | Molded | 2 hrs | 5 | 4 |
| | | 4 hrs | 5 | 4 |
| | | 2 days | 4 | 4 |
| | | 3 days | 5 | 4 |
| 35 | Open cell | 2 hrs | 3.75 | 3.75 |
| | Molded | 2 hrs | 1 | 5 |
| 36 | Open cell | 2 hrs | 4.5 | 3 |
| | Molded | 2 hrs | 5 | 5 |
| 37 | Open cell | 2 hrs | 3 | 3 |
| | Molded | 2 hrs | 4 | 5 |
| 38 | Open cell | 2 hrs | 2.75 | 3 |
| | Molded | 2 hrs | 5 | 5 |

From the data, it can be seen that the adhesives of the invention exhibit consistent performance on molded foam for the various open times.

In addition, the adhesive compositions (each composition prepared at approximately 50% solid content) were tested for elevated temperature stability according to the test method "Elevated Temperature Stability" previously described. The time intervals, pH, and % coagulation results are in Table 15 below. Examples 31 and 32 coagulated after 1 week at room temperature. Examples 33 and 34 coagulated after 2 weeks at room temperature. No data was taken at 4 weeks.

TABLE 15

| | pH, % Coagulation | | | | | |
|---|---|---|---|---|---|---|
| Ex. No. | 0 wks | 1 wk | 2 wks | 3 wks | 5 wks | 6 wks |
| 29 | 8.08 | 8.03 | 8.07 | 7.88 | 7.80 | 7.57 |
| 30 | 7.97 | 8.18 | 8.17 | 8.04 | 7.96 | 7.80 |
| 35 | 7.82 | 7.81 | 7.64 | 7.45 | —, 30% | — |
| 36 | 7.75 | 7.87 | 7.73 | 7.52 | —, 30% | — |
| 37 | 7.03 | 7.06 | 7.09 | 6.98 | —, 100% | — |
| 38 | 7.07 | 7.14 | 7.17 | 7.05 | 6.97 | 6.84 |

In addition, Examples 29–38 and C-1 were tested for 180° peel strength at room temperature and after environmental exposure of various substrates to twill, and T-peel strength at room temperature and after environmental exposure of twill to twill bonds. Examples 29–34 and C-1 were tested for heat resistance of twill to twill bonds. Examples 29, 30, and 33–38 were tested for time based storage modulus. The test methods used are those described herein above.

Test results are given in Table 16 (peel strength), Table 17 (heat resistance), and Table 18 (time based storage modulus).

TABLE 16

| | | | Peel Strength, piw (kN/m) | |
|---|---|---|---|---|
| Ex. No. | Test | Test Substrates | RT | ENV |
| 29 | 180° Peel | Twill/plywood | 15.6 (2.7) | 17.3 (3.0) |
| | | Twill/CRS | 16.5 (2.9) | 16.1 (2.8) |
| | | Twill/ABS | 17 (3.0) | 17 (3.0) |
| | T-Peel | Twill/twill | 9.3 (1.6) | — |
| 30 | 180° Peel | Twill/plywood | 17 (3.0) | 18.4 (3.2) |
| | | Twill/CRS | 15.9 (2.8) | 18.2 (3.2) |
| | | Twill/ABS | 17.6 (3.1) | 18.2 (3.2) |
| | T-Peel | Twill/twill | 12.9 (2.3) | — |

TABLE 16-continued

| | | Peel Strength, piw (kN/m) | |
|---|---|---|---|
| Ex. No. | Test | Test Substrates | RT | ENV |
| 31 | 180° Peel | Twill/plywood | 16.1 (2.8) | 19.4 (3.4) |
| | | Twill/CRS | 17.8 (3.1) | 22.7 (4.0) |
| | | Twill/ABS | 20.1 (3.5) | 22.7 (4.0) |
| | T-Peel | Twill/twill | 15.4 (2.7) | — |
| 32 | 180° Peel | Twill/plywood | 16.5 (2.9) | 16.4 (2.9) |
| | | Twill/CRS | 18 (3.2) | 21.4 (3.8) |
| | | Twill/ABS | 18.5 (3.3) | 24.3 (4.3) |
| | T-Peel | Twill/twill | 13.2 (2.3) | — |
| 33 | 180° Peel | Twill/plywood | 7.4 (1.3) | 15.5 (2.7) |
| | | Twill/CRS | 7.8 (1.4) | 15.9 (2.8) |
| | | Twill/ABS | 9.7 (1.7) | 14.2 (2.5) |
| | T-Peel | Twill/twill | 6 (1.05) | — |
| 34 | 180° Peel | Twill/plywood | 10.1 (1.8) | 20.5 (3.6) |
| | | Twill/CRS | 9.5 (1.7) | 19.9 (3.5) |
| | | Twill/ABS | 10.5 (1.8) | 19.4 (3.4) |
| | T-Peel | Twill/twill | 6.6 (1.2) | — |
| 35 | 180° Peel | Twill/plywood | <1 (<0.18) | 5.1 (0.90) |
| | | Twill/CRS | <1 (<0.18) | 5.2 (0.91) |
| | | Twill/ABS | <1 (<0.18) | 6.1 (1.07) |
| | T-Peel | Twill/twill | <1 (<0.18) | — |
| 36 | 180° Peel | Twill/plywood | <1 (<0.18) | 12.1 (2.1) |
| | | Twill/CRS | <1 (<0.18) | 11 (1.9) |
| | | Twill/ABS | <1 (<0.18) | 11 (1.9) |
| | T-Peel | Twill/twill | <1 (<0.18) | — |
| 37 | 180° Peel | Twill/plywood | <1 (<0.18) | 2.4 (0.42) |
| | | Twill/CRS | <1 (<0.18) | 3.4 (0.60) |
| | | Twill/ABS | <1 (<0.18) | 2.3 (0.40) |
| | T-Peel | Twill/twill | <1 (<0.18) | — |
| 38 | 180° Peel | Twill/plywood | <1 (<0.18) | 1.3 (0.23) |
| | | Twill/CRS | <1 (<0.18) | 1.8 (0.32) |
| | | Twill/ABS | <1 (<0.18) | 1.7 (0.3) |
| | T-Peel | Twill/twill | <1 (<0.18) | — |
| C-1 | 180° Peel | Twill/plywood | 13.8 (2.4) | 13.9 (2.4) |
| | | Twill/CRS | 12.6 (2.2) | 12.1 (2.1) |
| | | Twill/ABS | 3.7 (0.65) | <1 (<0.18) |
| | T-Peel | Twill/twill | 9.2 (1.6) | — |

TABLE 17

| | Heat Resistance Bond Separation, inches (mm) | | | | | | | | |
|---|---|---|---|---|---|---|---|---|---|
| Ex. No. | At 40° C. | At 45° C. | At 50° C. | At 55° C. | At 60° C. | At 65° C. | At 70° C. | At 75° C. | At 80° C. |
| 29 | 0 (0) | 0 (0) | 0 (0) | 0.3 (7) | 1.3 (34) | — | — | — | — |
| 30 | 0 (0) | 0 (0) | 0 (0) | 0.2 (5) | 1.4 (35) | — | — | — | — |
| 31 | 0 (0) | 0 (0) | 0 (0) | 0 (0) | 0.08 (2) | 0.12 (3) | 0.55 (14) | 0.7 (18) | 1.1 (27) |
| 32 | 0 (0) | 0 (0) | 0 (0) | 0.3 (7) | 0.3 (8) | 0.5 (13) | 0.8 (21) | 1.2 (30) | — |
| 33 | 0.7 (17) | 0.5 (13) | 0.5 (13) | 0.4 (11) | 0.7 (17) | 1.4 (36) | — | — | — |
| 34 | 0 (0) | 0 (0) | 0 (0) | 0 (0) | 0.3 (7) | 0.5 (12) | 0.8 (20) | 1.2 (30) | — |
| C-1 | 0 (0) | 0.7 (17) | 2.8 (72) | — | — | — | — | — | — |

TABLE 18

| | Time Based G', % Increase | | | | | |
|---|---|---|---|---|---|---|
| Ex. No. | 2 minutes | 5 minutes | 10 minutes | 20 minutes | 30 minutes | Max. G' × $10^7$ |
| 29 | 123 | 372 | 575 | 608 | 611 | 1.44 |
| 30 | 34 | 115 | 363 | 1131 | 1512 | 3.86 |

TABLE 18-continued

| | Time Based G', % Increase | | | | | |
|---|---|---|---|---|---|---|
| Ex. No. | 2 minutes | 5 minutes | 10 minutes | 20 minutes | 30 minutes | Max. G' × $10^7$ |
| 33 | 238 | 303 | 310 | 303 | — | 1.84 |
| 34 | 189 | 804 | 1223 | 1070 | 890 | 2.36 |
| 35 | 123 | 475 | 908 | 954 | 840 | 1.77 |
| 36 | 45 | 203 | 715 | 1335 | 1115 | 1.93 |
| 37 | 105 | 136 | 153 | 168 | 175 | 0.994 |
| 38 | 93 | 145 | 170 | 186 | 195 | 1.32 |

This invention may take on various modifications and alterations without departing from the spirit and scope thereof. Accordingly, it is to be understood that this invention is not to be limited to the above-described, but it is to be controlled by the limitations set forth in the following claims and any equivalents thereof. It is also to be understood that this invention may be suitably practiced in the absence of any element not specifically disclosed herein.

What is claimed is:

1. A low temperature, activatable, water-dispersed adhesive composition comprising a mixture of:
   one or more low modulus crystallizing polyester polyurethanes;
   one or more acrylic ester copolymers;
   one or more hydrophobically-modified associative polyurethanes; and
   a stabilizer system comprising a combination of one or more carbodiimides and one or more branched primary amino alcohols.

2. The low temperature thermally activatable water-dispersed adhesive composition of claim 1 wherein the acrylic ester copolymer is present in the composition in an amount of from about 60 to about 400 parts per 100 parts low modulus crystallizing polyester polyurethane on a dry weight basis.

3. The low temperature thermally activatable water-dispersed adhesive composition of claim 1 wherein the one or more hydrophobically-modified associative polyurethanes is present in the composition in an amount of from about 0.05 to about 2 parts per 100 parts low modulus crystallizing polyester polyurethane on a dry weight basis.

4. The low temperature thermally activatable water-dispersed adhesive composition of claim 1 wherein the carbodiimide is present in the composition in an amount of from about 1 to about 8 parts per 100 parts low modulus crystallizing polyester polyurethane on a dry weight basis and the branched primary amino alcohol is present in the composition in an amount of from about 1.5 to about 7.0 parts per 100 parts low modulus crystallizing polyester polyurethane on a dry weight basis.

5. The low temperature thermally activatable water-dispersed adhesive composition of claim 1 wherein the acrylic ester copolymer comprises a copolymer of butyl acrylate and methyl methacrylate.

6. The low temperature thermally activatable water-dispersed adhesive composition of claim 1 wherein the carbodiimide is selected from the group consisting of poly(nitrilomethanetetraylnitrilo(2,4,6-tris(1-methylethyl)-1,3-phenylene), tetraisopropyldiphenylcarbodiimide, and combinations thereof.

7. The low temperature thermally activatable water-dispersed adhesive composition of claim 1 wherein the branched primary amino alcohol is selected from the group consisting of 2-amino-1-butanol; 2-amino-2-methyl-1,3-propanediol; 2-amino-2-methyl-1-propanol; 2-amino-2-ethyl-1,3-propanediol; tris(hydroxymethyl)aminomethane, and combinations thereof.

8. The low temperature thermally activatable water-dispersed adhesive composition of claim 1 wherein the low modulus crystallizing polyester polyurethane is carboxylated.

9. The low temperature thermally activatable water-dispersed adhesive composition of claim 1 wherein the low modulus crystallizing polyester polyurethane has a storage modulus (G') at 25° C. of about $1 \times 10^8$ to about $1 \times 10^9$ dynes/cm$^2$ as measured by DMA at a frequency of 1 Hertz.

10. The low temperature thermally activatable water-dispersed adhesive composition of claim 1 further comprising an antioxidant.

11. The low temperature thermally activatable water-dispersed adhesive composition of claim 1 further comprising a pigment.

12. A low temperature thermally activatable adhesive comprising a mixture of:
   one or more low modulus crystallizing polyester polyurethanes;
   one or more acrylic ester copolymers;
   one or more hydrophobically-modified associative polyurethanes; and
   a stabilizer system comprising a combination of one or more carbodiimides and one or more branched primary amino alcohols.

13. The adhesive of claim 12 wherein the adhesive has an open time of at least 24 hours.

14. The adhesive of claim 12 in the form of a self-supporting film.

15. A bonded article comprising the adhesive of claim 12 bonded to a substrate.

16. The bonded article of claim 15 wherein the substrate is selected from the group consisting of open cell foams, closed cell foams, molded foams, wood, fabrics, metals, plastics, and combinations thereof.

17. The bonded article of claim 16 wherein the foams comprise materials selected from the group consisting of polyurethanes, polystyrenes, polychloroprenes, and combinations thereof.

18. The bonded article of claim 16 wherein the fabrics comprise materials selected from the group consisting of acrylics, vinyls, leathers, cottons, nylons, polyesters, rayons, and combinations thereof.

19. The bonded article of claim 16 wherein the plastics are selected from the group consisting of polyvinyl chlorides, acrylonitrile/butadiene/styrene terpolymers, high impact polystyrenes, and combinations of the foregoing with polycarbonates.

* * * * *

UNITED STATES PATENT AND TRADEMARK OFFICE
CERTIFICATE OF CORRECTION

PATENT NO. : 6,541,550 B1
APPLICATION NO. : 09/543071
DATED : April 1, 2003
INVENTOR(S) : Arianne E. McCarthy It is certified that error appears in the above-identified patent and that said Letters Patent is hereby corrected as shown below:

Title Page.
Item (56), References Cited, OTHER PUBLICATIONS, Page 2, Column 1, Line 63, delete "AquaStik 198 1120" and insert in place thereof -- AquaStik™ 1120 --.

Item (56), References Cited, OTHER PUBLICATIONS, Page 2, Column 2, Line 42, delete "Merqunsa" and insert in place thereof -- Merquinsa --.

Item (56), References Cited, OTHER PUBLICATIONS, Page 2, Column 2, Line 59, delete "UMO 1630RI" and insert in place thereof -- UMO1630R1 --.

Column 10.
Line 22, delete "acrylonitrile-butadienetyrene" and insert in place thereof
-- acrylonitrile-butadiene-styrene --.

Signed and Sealed this

Twenty-seventh Day of February, 2007

JON W. DUDAS
*Director of the United States Patent and Trademark Office*